United States Patent
Abrol et al.

(10) Patent No.: US 7,839,804 B2
(45) Date of Patent: Nov. 23, 2010

(54) METHOD AND APPARATUS FOR PERFORMING CALL SETUP FOR A VIDEO CALL IN 3G-324M

(75) Inventors: Nischal Abrol, San Diego, CA (US);
Tao Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 791 days.

(21) Appl. No.: 11/081,124

(22) Filed: Mar. 15, 2005

(65) Prior Publication Data

US 2007/0058794 A1 Mar. 15, 2007

Related U.S. Application Data

(60) Provisional application No. 60/588,457, filed on Jul. 15, 2004.

(51) Int. Cl.
*H04L 12/18* (2006.01)
*H04W 4/00* (2009.01)

(52) U.S. Cl. .................................... 370/261; 370/329

(58) Field of Classification Search .................. None
See application file for complete search history.

(56) References Cited

U.S. PATENT DOCUMENTS

| | | | | |
|---|---|---|---|---|
| 7,447,513 | B2 * | 11/2008 | Anttila et al. | 455/519 |
| 2004/0078468 | A1 * | 4/2004 | Hedin et al. | 709/227 |
| 2004/0174817 | A1 | 9/2004 | Jabri et al. | |

(Continued)

FOREIGN PATENT DOCUMENTS

EP 1143684 10/2002

(Continued)

OTHER PUBLICATIONS

International Telecommunication Union, Series H: Audiovisual and Multimedia Systems; ITU-T Recommendation H.324 , Sep. 2005.

(Continued)

*Primary Examiner*—Ricky Ngo
*Assistant Examiner*—Clemence Han
(74) *Attorney, Agent, or Firm*—Timothy F. Loomis; Campbell C. Chiang

(57) ABSTRACT

For quick call setup, terminal A sends to terminal B stuffing sequences for the highest H.223 multiplexer level supported by terminal A and at least one proprietary sequence. The proprietary sequence indicates support for quick call setup and contains video and audio codecs supported by terminal A. Terminal A monitors for stuffing and proprietary sequences sent by terminal B. If terminal A receives a proprietary sequence from terminal B, then terminal A sends an H.245 NonStandard request message containing the information in the proprietary sequence sent to terminal B, video and/or audio capabilities supported by terminal A, and entries for a multiplex table used by terminal A. Terminal A monitors for a NonStandard request message from terminal B, which contains video and audio capabilities and multiplex table entries for terminal B. Terminals A and B are ready to communicate upon each terminal receiving an acknowledgment from the other terminal.

77 Claims, 6 Drawing Sheets

U.S. PATENT DOCUMENTS

| | | | |
|---|---|---|---|
| 2007/0127512 A1* | 6/2007 | Jabri et al. | 370/410 |
| 2007/0171922 A1* | 7/2007 | Jabri et al. | 370/401 |
| 2007/0218924 A1* | 9/2007 | Burman et al. | 455/466 |
| 2007/0266161 A1* | 11/2007 | Kenrick et al. | 709/227 |
| 2007/0297352 A1* | 12/2007 | Jabri et al. | 370/261 |

FOREIGN PATENT DOCUMENTS

| | | |
|---|---|---|
| WO | 2004054221 | 6/2004 |
| WO | WO 2004054221 A1 * | 6/2004 |

OTHER PUBLICATIONS

Radvision, Ltd. "3G Powered 3G-324M Protocol". 2002. pp. 1-12.

Dilithium Networks. "Reducing 3G Call Session Setup Time Using Accelerated Setup Methods". Sep. 2005. pp. 1-20.

Radvision, Ltd. "WNSRP: The Preferred Solution for Reducing 3G-324M Call Setup Time": 2005. pp. 1-20.

International Search Report and Written Opinion - PCT/US05/025169, International Search Authority - European Patent Office - Mar. 10, 2006.

* cited by examiner

METHOD AND APPARATUS FOR PERFORMING CALL SETUP FOR A VIDEO CALL IN 3G-324M

This application claims the benefit of provisional U.S. Application Ser. No. 60/588,457, entitled "Method to Speedup Callsetup in Video Calls on 3G-324M Implementations," filed Jul. 15, 2004, and incorporated herein by reference in its entirety for all purposes.

BACKGROUND

I. Field

The present invention relates generally to communication, and more specifically to techniques for performing call setup for a video call.

II. Background

Wireless communication networks are widely deployed to provide various communication services such as voice, video, data, and so on. These networks may be multiple-access networks capable of providing communication for multiple users by sharing the available system resources (e.g., bandwidth and/or transmit power). Examples of such multiple-access networks include a Code Division Multiple Access (CDMA) network, a Time Division Multiple Access (TDMA) network, a Frequency Division Multiple Access (FDMA) network, and an Orthogonal Frequency Division Multiple Access (OFDMA) network.

Video telephony or videophone is a rapidly growing application for many wireless communication networks. A videophone application transmits voice and video simultaneously using, for example, a 3G-324M standard that is defined by 3GPP and 3GPP2 standard bodies. The 3G-324M standard is based on ITU-T Recommendation H.324, entitled "Terminal for Low Bit Rate Multimedia Communication." H.324 utilizes both ITU-T Recommendation H.223, entitled "Multiplexing Protocol for Low Bit Rate Multimedia Communication," and ITU-T Recommendation H.245, entitled "Control Protocol for Multimedia Communication." H.324 is an international standard for multimedia communication on a low bit rate circuit-switched network. H.223 is a protocol that receives video, audio, data, and control as separate media streams and generates multiplex protocol data units (MUX-PDUs) for these streams. H.245 is a protocol for exchanging signaling to setup and manage an H.324 circuit-switched video telephony call (or simply, a video call) between two terminals that are end-points of the video call.

Setting up a video call in a wireless network that supports 3G-324M standard (or simply, a 3G-324M wireless network) typically takes a long time. Each terminal is normally not aware of the capabilities of the other terminal. Furthermore, no configuration information is available a priori on how multimedia data should be sent and received. Hence, the two terminals typically exchange multiple rounds of signaling messages for call setup in order for each terminal to ascertain the capabilities of the other terminal and to configure pertinent parameters for the video call. This allows the two terminals to successfully send and receive multimedia data. The long time required to perform the call setup is highly undesirable since a user must wait for the call setup to be completed before multimedia data can be sent or received. Furthermore, valuable system resources are expended to exchange the multiple rounds of signaling messages.

There is therefore a need in the art for techniques to expedite call setup for a video call in a 3G-324M wireless network.

SUMMARY

A quick call setup procedure that can expedite call setup for a video call is described herein. The quick call setup procedure includes a mobile level detect phase and a capability and multiplex table entry exchange phase (or simply, "phase 2").

For the mobile level detect phase, terminal A sends to another terminal B stuffing sequences for the highest H.223 multiplexer level supported by terminal A as well as at least one "proprietary" sequence. The stuffing sequence is defined by H.324. The proprietary sequence indicates that the transmitting terminal supports the quick call setup procedure and further indicates the video and audio coders/decoders (codecs) supported by the transmitting terminal and the preference for these video and audio codecs. Terminal A monitors for stuffing sequences and proprietary sequences, if any, sent by terminal B.

If terminal A receives a proprietary sequence from terminal B, then terminal A initiates phase 2 of the quick call setup procedure. For phase 2, terminal A periodically sends an H.245 NonStandard request message to ensure that terminal B can receive the message. This NonStandard request may contain, for example, the information included in the proprietary sequence sent to terminal B, selected video and/or audio capabilities supported by terminal A, entries for a multiplex table used by terminal A, and so on. Terminal A also sets up its receive channels for incoming audio and video data from terminal B. Upon receiving an NSRP acknowledgment that terminal B has correctly received the NonStandard request message sent by terminal A, terminal A stops sending the NonStandard request message.

Terminal A also monitors for a NonStandard request message sent by terminal B, which contains the video and audio capabilities and the multiplex table entries for terminal B. Upon receiving the NonStandard request message from terminal B, terminal A is ready to send correctly configured audio/video data to terminal B. Terminal A also sends an NSRP acknowledgment to terminal B to inform terminal B that the NonStandard request has been received by terminal A and that terminal B can expect to receive audio/video data soon from terminal A. The entire phase 2 may be efficiently performed with a single exchange of the NonStandard request message, instead of many (e.g., ten or possibly more) H.245 signaling messages normally needed to set up the video call in accordance with the H.324 standard.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
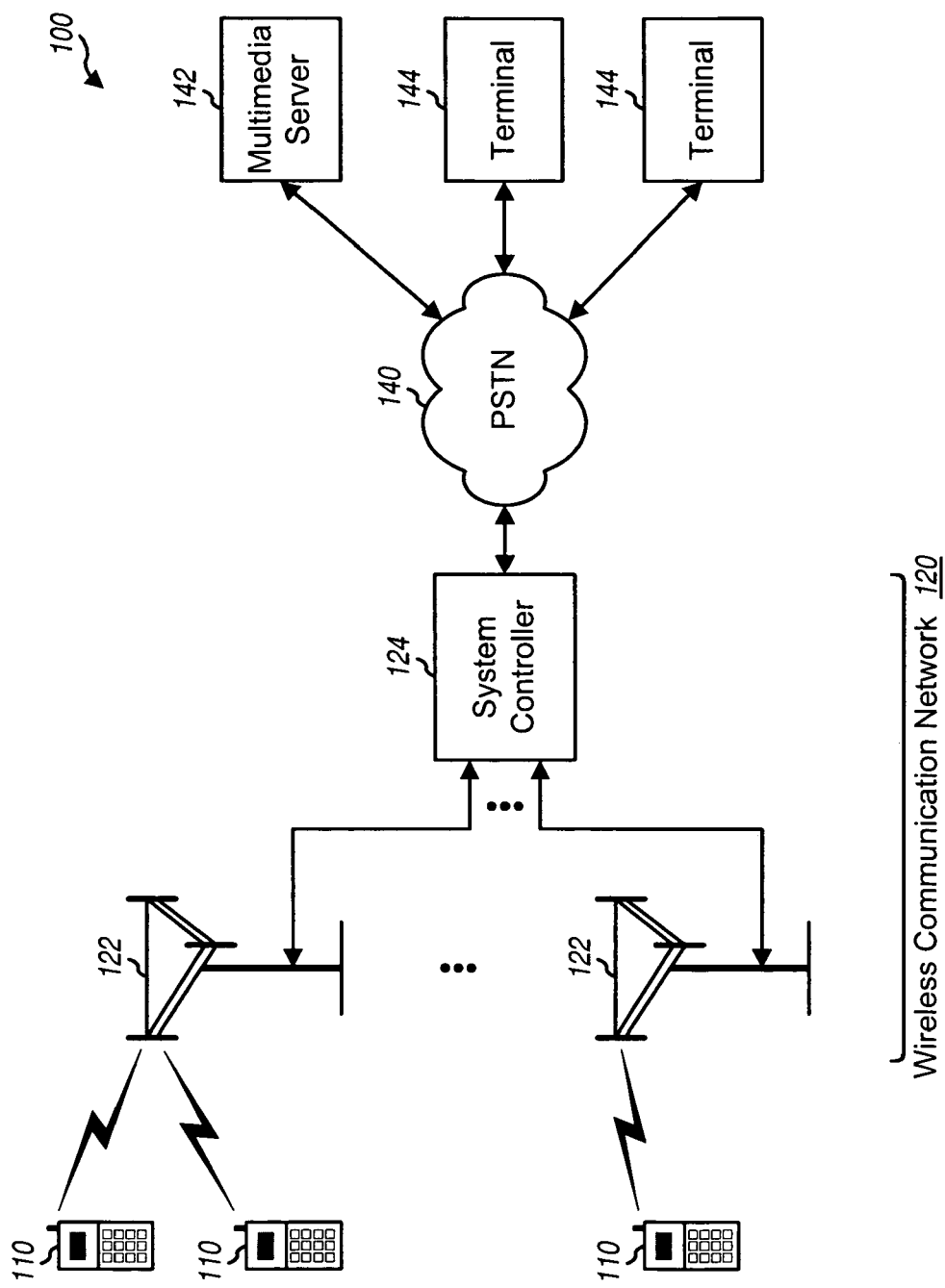
FIG. 1 shows a wireless communication network.

FIG. 1 shows a deployment 100 in which wireless terminals 110 communicate with a wireless communication network 120 to obtain communication services. A wireless terminal may be fixed or mobile and may also be called a user equipment (UE), a mobile station (MS), a wireless device, a handset, a subscriber unit, or some other terminology. Wireless network 120 includes base stations 122 and a system controller 124. A base station is a fixed station that communicates with the wireless terminals and may also be called a Node B, a base transceiver subsystem (BTS), an access point, or some other terminology. Each base station provides communication coverage for a particular geographic area. System controller 124 couples to base stations 122 and provides coordination and control for these base stations. System controller 124 may represent a collection of network entities such as a radio network controller (RNC), a base station controller (BSC), a mobile switching center (MSC), and so on.

System controller 124 may further couple to other systems and networks, such as a public switched telephone network (PSTN) 140, an integrated services digital network (ISDN), a packet data serving node (PDSN), a general packet radio service (GPRS) support node (GSN), and so on. PSTN 140 is a circuit-switched telephone network that carries analog voice data. ISDN can send voice, video, and data over digital or analog telephone lines. PDSN and GSN provide packet-switched data services for the wireless terminals and perform conventional network access point functionality for setup, maintenance, and termination of data calls. Various entities may be coupled to PSTN 140 such as a multimedia server 142 and remote terminals 144.

Wireless network 120 may be a CDMA network, a TDMA network, and so on. A CDMA network may implement one or more CDMA radio access technologies (RATs) such as cdma2000 and Wideband-CDMA (W-CDMA). cdma2000 covers IS-2000, IS-856, and IS-95 standards. A TDMA system may implement one or more TDMA RATs such as Global System for Mobile Communications (GSM). These various RATs and standards are well known in the art. W-CDMA and GSM are described in documents from a consortium named "3$^{rd}$ Generation Partnership Project" (3GPP). cdma2000 is described in documents from a consortium named "3$^{rd}$ Generation Partnership Project 2" (3GPP2). 3GPP and 3GPP2 documents are publicly available.

As noted above, the process to set up a video call between two terminals via a wireless network is typically long. These two terminals are called terminal A and terminal B in the description below. One of the terminals (e.g., terminal A) is typically a user terminal such as, for example, a cellular phone, a wireless digital personal assistant (PDA), and so on. The other terminal may be a user terminal, a server, or some other network entity (e.g., a media gateway) that supports H.324.

To set up the video call, a connection is first established and network resources (e.g., traffic or physical channels) are allocated to allow the two terminals to exchange data and signaling via wireless network 120. The two terminals then perform initialization to determine the capabilities of the other terminal and to configure the video call. Table 1 lists various procedures for the initialization process. Other tasks may also be performed as part of the initialization process.

TABLE 1

| Procedures | Description |
| --- | --- |
| Mobile level detect phase | Determine the highest H.223 multiplexer level supported by both terminals. |
| Capability Exchange Signaling Entity (CESE) | Procedures used by the terminals to communicate their transmit and receive capabilities for video and audio. |
| MasterSlave Determination Signaling Entity (MSDSE) | Procedures that allow the terminals to determine which is the master terminal and which is the slave terminal. |
| Multiplex Table Signaling Entity (MTSE) | Procedures that allow a transmitting terminal to send entries for a multiplex table. |
| Logical Channel Signaling Entity (LCSE) | Procedures used to open and close logical channels. |

The mobile level detect phase is the first part of the initialization process and is performed to determine the highest H.223 multiplexer level (or simply, H.223 level) supported by both terminals. H.223 defines four different multiplexer levels that offer progressively greater robustness against channel errors at the cost of progressively greater overhead and complexity. Level 0 is the least robust and uses an 8-bit high-level data link control (HDLC) flag of '0111 1110' to delimit MUX-PDUs. Level 1 is more robust than Level 0 and uses a 16-bit pseudo-random number (PN) flag of '1110 0001 0100 1101' to delimit MUX-PDUs. This PN flag improves flag detection performance in an error-prone channel. Level 2 is more robust than Level 1 and uses the 16-bit PN flag to delimit MUX-PDUs as well as a 3-byte header for each MUX-PDU. Level 3 is more robust than Level 2, uses the 16-bit PN flag and the 3-byte header at a multiplex layer, and employs other error protection features at an adaptation layer that resides above the multiplex layer. For 3G-324M, support for Levels 0, 1 and 2 is mandatory and support for Level 3 is optional.

For the mobile level detect phase, each terminal starts transmitting a stuffing sequence for the highest H.223 level supported by that terminal. The stuffing sequences for the four H.223 levels are as follows:

Level 0—1-byte HDLC flag.
Level 1—2-byte PN flag.
Level 2—2-byte PN flag and 3-byte header (with MC=0000).
Level 3—2-byte PN flag and 3-byte header (with MC=1111).

The 3-byte header includes a 4-bit multiplex code (MC) field, an 8-bit multiplex payload length (MPL) field, and a 12-bit parity field. The MPL field is set to '0000 0000' for both Levels 2 and 3 stuffing sequences. The MC field is set to '0000' for the Level 2 stuffing sequence and to '1111' for the Level 3 stuffing sequence. The parity field carries a 12-bit extended Golay code that is calculated over the MC and MPL fields.

While transmitting the stuffing sequences, each terminal also detects for the stuffing sequence sent by the other terminal. Each terminal looks for Level 0 stuffing sequences first and progresses upward in level until a stuffing sequence at the same or lower H.223 level is detected. If a terminal detects a stuffing sequence of a lower H.223 level, then the terminal starts transmitting the stuffing sequence for this H.223 level. This mobile level detect phase allows both terminals to determine the highest H.223 level that is supported by these terminals. An H.245 control channel is then operated at this H.223 level to achieve robust performance for an error-prone communication channel.

Upon completing the mobile level detect phase, the two terminals typically perform the procedures for CESE, MSDSE, MTSE, and LCSE listed in Table 1. CESE is used to exchange the capabilities supported by both terminals and is performed first. These capabilities may relate to multiplexing, video, audio, data applications, security, conference, user inputs, and so on. For example, CESE is used to determine the specific video and audio codecs to use for the call. MSDSE is used to designate the master terminal and the slave terminal in case of a conflict.

LCSE is used to open and close logical channels for the video call. Each logical channel may be used to send an information stream, which may be for control data or multimedia data for the video call. Different types of media (e.g., video, audio, and data) are typically sent in different streams. MTSE is used to update the multiplex table, which contains up to 16 entries for up to 16 different MUX-PDU formats. Each MUX-PDU format indicates the specific logical channel(s) being sent in a MUX-PDU and the number of bits for each logical channel sent in the MUX-PDU. The MC field for each MUX-PDU indicates the format for that MUX-PDU. The multiplex table entry for that format is then used to associate each octet within the MUX-PDU to a specific logical channel.

At least one exchange (or round) of signaling messages is typically performed for each of CESE, MSDSE, LCSE, and MTSE. For example, an exchange of a TerminalCapabilitySet message and its response message is used for CESE. An exchange of a MasterSlaveDetermination message and its response message is used for MSDSE. An exchange of one or more OpenLogicalChannel messages for each audio or video channel and one or more corresponding response messages is used for LCSE. An exchange of a MultiplexEntrySend message and its response message is used for MTSE. There are typically many rounds of signaling messages in order to complete call set up for the video call.

Figure 2:
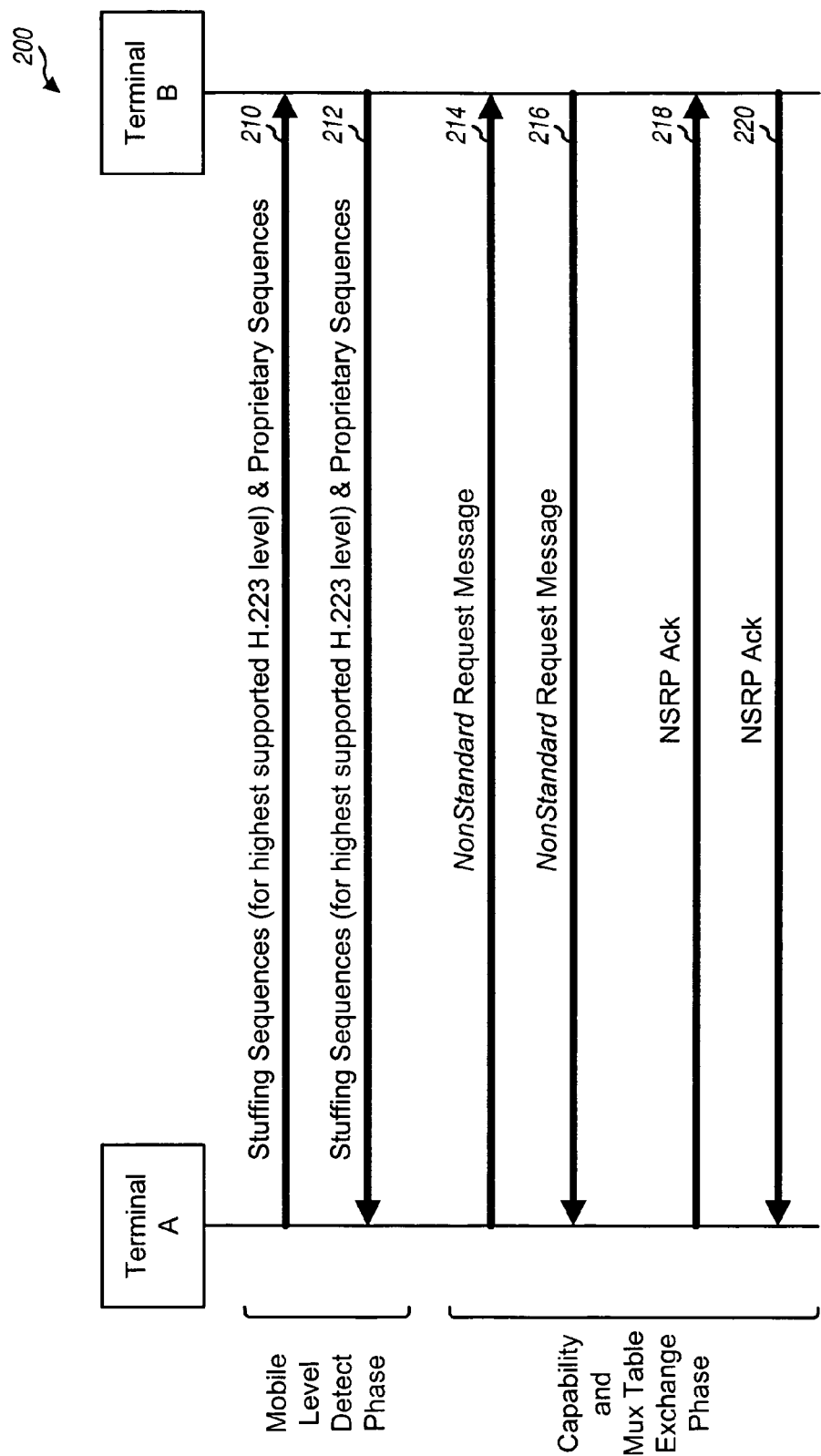
FIG. 2 shows a call flow for the quick call setup procedure.

FIG. 2 shows a call flow for an embodiment of a quick call setup procedure 200 to quickly set up a video call. For the mobile level detect phase, terminal A starts transmitting the stuffing sequence for the highest H.223 level supported by terminal A (step 210). Terminal B also starts transmitting the stuffing sequence for the highest H.223 level supported by terminal B (step 212). Each terminal typically transmits the stuffing sequence for approximately half of a round trip time, e.g., around 160 stuffing sequences in around 100 millisecond (ms) in a GSM network. Each terminal that supports the quick call setup procedure also periodically inserts and transmits the proprietary sequence along with the stuffing sequence. This proprietary sequence carries pertinent information used to expedite call setup and is described below.

Each terminal is prepared to receive the stuffing sequence for the lowest H.223 level, as in the normal mobile level detect phase. A terminal that supports the quick call setup procedure (or simply, a "new terminal") also detects for the proprietary sequence from the other terminal. A terminal that does not support the quick call setup procedure (or simply, a "legacy terminal") would not recognize the proprietary sequence and would simply discard the proprietary sequence as erroneous data. The transmission of the proprietary sequence does not impede the mobile level detect phase for the legacy terminal because this terminal has received the normal stuffing sequence.

Each terminal that receives and recognizes the proprietary sequence would realize that the other terminal supports the quick call setup procedure. If both terminals support the quick call setup procedure, then CESE, MSDSE, LCSE, and MTSE are performed automatically without exchanging H.245 signaling messages that are specific for these procedures. CESE is accomplished via the proprietary sequence, which carries basic capabilities of the terminal transmitting the proprietary sequence. MSDSE is accomplished, e.g., by presuming that the originating terminal A is the master and the other terminal B is the slave. MTSE and LCSE are accomplished via an exchange of a NonStandard request message in phase 2 of the quick call setup procedure.

Upon receiving the proprietary sequence from terminal B, terminal A sends a NonStandard request message (step 214). This NonStandard request message carries the capabilities included in the proprietary sequence sent by terminal A. The NonStandard request message also carries selected codec parameters and multiplex table entries used in opened logical channels. The NonStandard request message may also carry other information that is pertinent for improving video call experience. An exemplary format for the NonStandard request message is described below. Upon sending the NonStandard request message to terminal B, terminal A sets up its receive channels for incoming audio/video data from terminal B.

Similarly, upon receiving the proprietary sequence from terminal A, terminal B also sends a NonStandard request message that carries the video and audio capabilities, multiplex table entries, codec parameters, and possibly other information for terminal B (step 216). Upon sending the NonStandard request message to terminal A, terminal B sets up its receive channels for incoming audio/video data from terminal A. Both terminals A and B complete setting up their receive channels upon sending the NonStandard request messages.

Each NonStandard request message, which is a Layer 3 message, is sent using a Numbered Simple Retransmission Protocol Response Frames (NSRP) protocol at Layer 2. The NSRP protocol is a reliable protocol that sends an NSRP acknowledgment (Ack) for each NSRP packet that is received correctly. To ensure that a receiving terminal receives the NonStandard request message from a transmitting terminal, the transmitting terminal periodically sends a NonStandard request message in an NSRP packet until an NSRP Ack is received from the receiving terminal to acknowledge receipt of the request message.

When Terminal A receives the NonStandard request message from terminal B, terminal A extracts all of the parameters that will be used to (1) configure its audio/video encoders in order to generate correct media data for terminal B and (2) form a transmit multiplex table used to multiplex the media data to be sent to terminal B. Terminal A thus initializes its audio/video decoders based on the video and audio capabilities in the composed NonStandard request message sent to terminal B in step 214 and initializes its audio/video encoders based on the video and audio capabilities in the NonStandard request message received from terminal B in step 216. Upon receiving the NonStandard request message in step 216, terminal A knows that terminal B is ready to receive and can send out audio/video data as soon as possible. Terminal A sends a Layer 2 NSRP acknowledgment for the Layer 3 NonStandard request message received from terminal B (step 218).

Similarly, terminal B receives the NonStandard request message from terminal A, extracts the information in the received message, and configures its audio/video encoders accordingly. Terminal B then sends to terminal A a Layer 2 NSRP acknowledgment for the NonStandard response message received from terminal A (step 220).

Terminal A receives the Layer 2 NSRP acknowledgment from terminal B and recognizes that terminal B has correctly received the NonStandard request message sent to terminal B. Terminal A then expects to receive incoming media from terminal B. Terminal B can start transmitting video and audio payload to terminal A using the exchanged capabilities and multiplex table entries. Similarly, terminal A can start transmitting media to terminal B upon receiving the NonStandard request message from terminal B. Alternately, terminals A and B can each wait for a NonStandard response message from the other terminal before starting transmission (not shown in FIG. 2). However, initiating transmission upon receiving the NSRP acknowledgment can speed up the call setup by half a round trip time because each terminal does not have to wait for the NonStandard response message from the other terminal.

As shown in FIG. 2, the call setup may be completed with one round trip of signaling messages. This can greatly reduce setup time over the conventional call setup procedure, which requires multiple rounds of signaling messages to set up the video call.

Figures 3, 4:
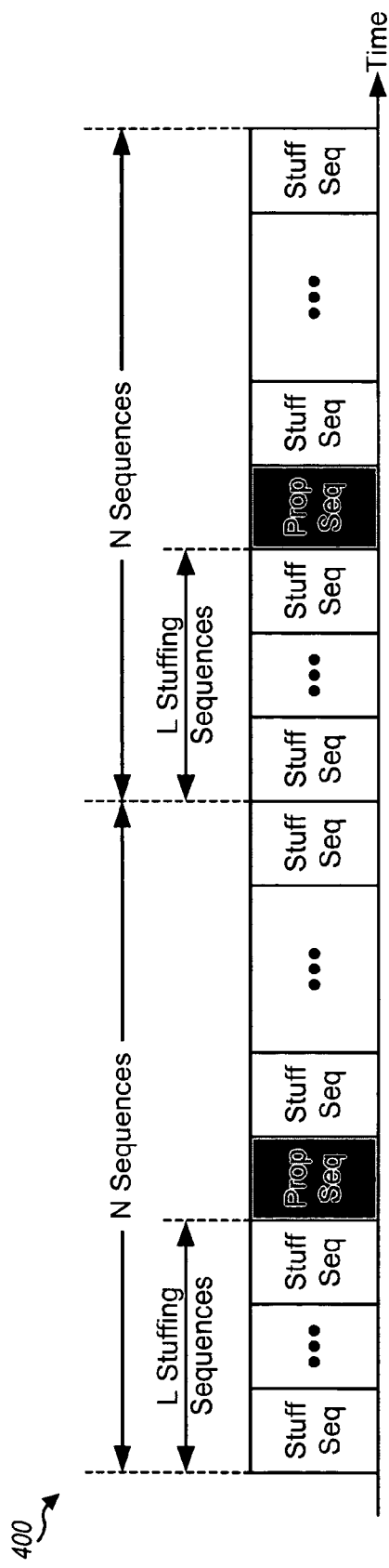
FIG. 3 shows an exemplary format for the proprietary sequence.
FIG. 4 shows transmission of the stuffing sequences and proprietary sequences for the mobile level detect phase.

FIG. 3 shows an exemplary format 300 for the proprietary sequence. A proprietary flag field 310 carries a 1-byte value that indicates the sequence is for the quick call setup procedure. This 1-byte value may be selected to minimize the likelihood of being erroneously mistaken for the stuffing sequence for any of the four H.223 levels. A field 312 carries a 1-byte cyclic redundancy check (CRC) value that is derived based on the other fields in the proprietary sequence. This CRC value is used by the receiving terminal for error detection.

A version number field 314 carries a 1-byte version number for the quick call setup procedure. The format for the remaining part of the proprietary sequence may be dependent on the version number. Different version numbers may utilize different fields and/or may specify different formats for these fields.

The version number may also be used to maintain backward compatibility with older versions of the quick call setup procedure. For example, one terminal may use an older version of the quick call setup procedure (e.g., version 0), and another terminal may use a newer version of this procedure (e.g., version 1). The terminal that supports version 0 (which is the "older terminal") would examine the proprietary sequence from the terminal that supports version 1 (which is the "newer terminal") and would know that the newer terminal supports the quick call setup procedure but is of a newer version. The older terminal may not understand the format of the remaining fields of the proprietary sequence. In this case, the older terminal does not send the NonStandard request message and instead waits for the NonStandard request message from the newer terminal. The older terminal would then extract and use the capability information to select the video codec, audio codec, and so on.

A video capability field 316 indicates the video capabilities of the terminal transmitting the proprietary sequence. The video capability is used to determine which video codec(s) to use during the video call. Field 316 may convey specific video codecs supported by the transmitting terminal and an order of preference for the supported video codecs.

In an embodiment, certain commonly used video codecs are mapped to specific locations within the 1-byte value for field 316. The value sent in each location then indicates the preference for the video codec mapped to that location. For example, MPEG4 may be mapped to the two leftmost bit positions, H.263 may be mapped to the next two leftmost bit positions, H.264 may be mapped to the next two leftmost bit positions, and the two rightmost bit positions may be reserved for future use. A video capability value of '10 11 01 00' then indicates that H.263 (with a priority value of '11') is the most preferred video codec, MPEG4 (with a priority value of '10') is the next most preferred video codec, and H.264 (with a priority value of '01') is the least preferred video codec. A priority value of '00' may be used to indicate that the video codec is not supported.

In another embodiment, certain commonly used video codecs are each assigned a unique value. Field 316 then indicates the video codecs supported by the transmitting terminal and the order of preference for the supported video codecs. For example, MPEG4 may be assigned a 2-bit value of '11', H.263 may be assigned a 2-bit value of '10', H.264 may be assigned a 2-bit value of '01', and '00' may be reserved for future use. The 1-byte value for field 316 may carry up to four 2-bit values for up to four supported video codecs, which are listed in order from the most preferred to the least preferred. For example, a video capability value of '10 11 01 00' indicates that H.263 (listed first) is the most preferred video codec, MPEG4 (listed second) is the next most preferred video codec, and H.264 (listed third) is the least preferred video codec. The video capability may also be sent in other manners.

An audio capability field 318 indicates the audio capabilities of the transmitting terminal. The audio capability is used to determine which audio codec(s) to use during the video call. Field 318 may indicate, for example, which audio codecs are supported by the transmitting terminal and the order of preference for the supported audio codecs. In an embodiment, certain commonly used audio codecs are mapped to specific locations within the 1-byte value for field 318. For example, a GSM Adaptive Multi Rate (AMR) vocoder may be mapped to the two leftmost bit positions, an Enhanced Variable Rate Coder (EVRC) vocoder may be mapped to the next two leftmost bit positions, a G.723.1 vocoder may be mapped to the next two leftmost bit positions, and the two rightmost bit positions may be reserved for future use. The value sent in each location then indicates the preference for the audio codec mapped to that location. In another embodiment, certain commonly used audio codecs are each assigned a unique value. Field 318 would then indicate the audio codec supported by the transmitting terminal and the order of preference for the supported audio codecs. For example, GSM AMR vocoder may be assigned a 2-bit value of '11', EVRC vocoder may be assigned a 2-bit value of '10', G.723.1 vocoder may be assigned a 2-bit value of '01', and '00' may be reserved for future use. The 1-byte value for field 318 may then carry up to four 2-bit values for up to four supported audio codecs listed in order of preference. The audio capability may also be sent in other manners.

FIG. 4 shows an exemplary transmission 400 of the stuffing sequences and the proprietary sequences for the mobile level detect phase. For this embodiment, the transmitting terminal sends L stuffing sequences (denoted as "Stuff Seq" in FIG. 4) for the highest supported H.223 level, followed by one proprietary sequence (denoted as "Prop Seq" in FIG. 4), followed by (N-L-1) more stuffing sequences. For this embodiment, one proprietary sequence is inserted along with (N-1) stuffing sequences. In general, L and N may each be any integer value and may be selected based on the system design. For example, in GSM, a data block is sent in every 20 milliseconds (ms) and contains 160 bytes. The data block is partitioned into two half blocks, with each half block containing 80 bytes. A receiving terminal typically detects for the stuffing sequence within the first 25 bytes of each data block. The transmitting terminal may then send five 5-byte stuffing sequences, followed by one 5-byte proprietary sequence, followed by whatever data that may be deemed appropriate. The same series of stuffing and proprietary sequences may be sent in each of the two half blocks so that the receiving terminal can detect for the proprietary sequence in either half block, e.g., in case one half block is received in error. In general, the proprietary sequence may be multiplexed with the stuffing sequences in any manner as long as a legacy terminal is able to detect the stuffing sequence and a new terminal is able to detect the proprietary sequence.

Figure 5:
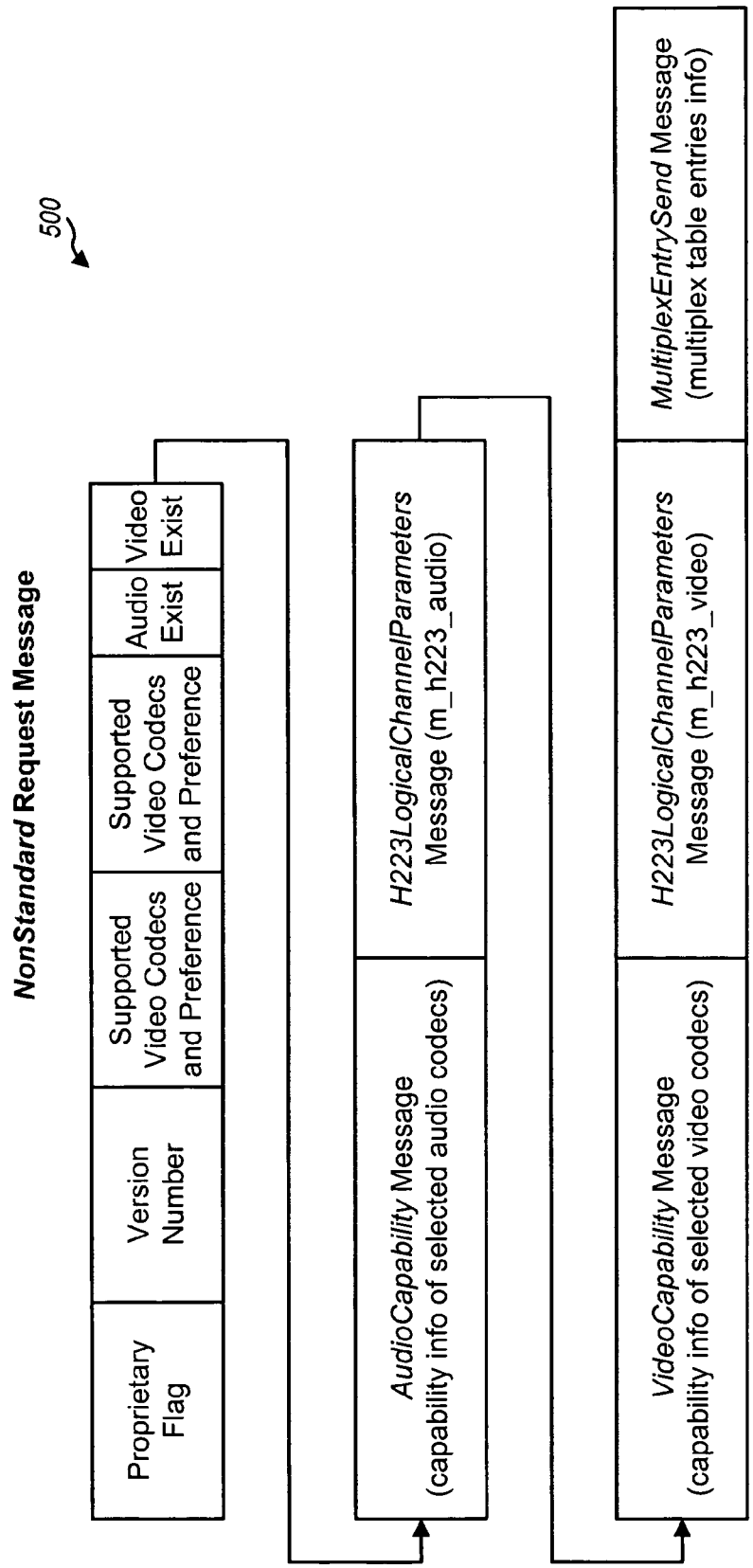
FIG. 5 shows an exemplary format for the NonStandard request message.

FIG. 5 shows an exemplary format 500 for the NonStandard request message, which carries pertinent information for the video call. Table 2 lists various fields for the exemplary NonStandard request message format.

decides which audio codec (if any) and which video codec (if any) to use to receive audio and video data from terminal B. Terminal A further defines the configuration for the selected audio and video codecs. The terminal A then conveys to terminal B two pieces of information: (1) which audio and video codecs terminal A will use to receive data from terminal B and (2) the configuration for the selected audio and video codecs. Terminal A sends these two pieces of information in the NonStandard request message.

The Audio Exist field indicates whether an AudioCapability field/message is included in the H.245 NonStandard request message being sent. The AudioCapability message carries parameter values for the selected audio codec. As an example for GSM AMR, the AudioCapability message may convey the audio unit size, whether comfort noise is supported, whether the audio data is scrambled, and so on. In general, different audio codecs have different parameters that may be sent in the AudioCapability message. The AudioCapability message is described in detail in the H.245 standard.

The Video Exist field indicates whether a VideoCapability field/message is included in the H.245 NonStandard request message. The VideoCapability message carries parameter values for the selected video codec. As an example for H.263, the VideoCapability message may convey (1) the minimum picture interval for encoding and/or decoding SQCIF pictures, QCIF pictures, CIF pictures, 4CIF pictures, and/or 16CIF pictures, (2) the maximum bit rate at which video can be transmitted or received, (3) capability to transmit and/or receive optional modes defined in the annexes of H.263, (4) whether the encoder is able to vary a trade-off between tem-

TABLE 2

| Field | Format | Description |
| --- | --- | --- |
| Proprietary Flag | Integer | Carry the proprietary flag that is sent in the proprietary sequence. |
| Version Number | Integer | Carry the version number that is sent in the proprietary sequence. |
| Video Codec Capability | Integer | Carry the video codec capability that is sent in the proprietary sequence. |
| Audio Codec Capability | Integer | Carry the audio codec capability that is sent in the proprietary sequence. |
| Audio Exist | Boolean | Indicate whether an AudioCapability message is being sent in the NonStandard request message. |
| Video Exist | Boolean | Indicate whether a VideoCapability message is being sent in the NonStandard request message. |
| AudioCapability | Message | Carry selected audio codec parameters for the transmitting terminal. |
| H223LogicalChannel-Parameters | Message | Carry information for the adaptation layer used for the audio. |
| VideoCapability | Message | Carry selected video codec parameters for the transmitting terminal. |
| H223LogicalChannel-Parameters | Message | Carry information for the adaptation layer used for the video. |
| MultiplexEntrySend | Message | Carry entries for the multiplex table used by the transmitting terminal to demultiplex incoming data. |

For the exemplary NonStandard request message format shown in Table 2 and FIG. 5, the first four fields carry the same information that is sent in the proprietary sequence. This information is repeated in the NonStandard request message in case the receiving terminal did not correctly receive the proprietary sequence.

Terminals A and B complete the audio and video codec selection after the mobile level detect phase. After receiving the proprietary sequences from terminal B, terminal A knows which audio and video codecs are supported by terminal B, compares the codecs supported by both terminals, and poral and spatial resolution, and (5) possibly other information. The VideoCapability message is described in detail in the H.245 standard.

The LogicalChannelParameters messages for video and audio are used to specify which adaptation layer to use to pack video and audio data prior to the multiplexer layer. Different adaptation layers use different CRC sizes, different sequence number for each packet, and so on.

The MultiplexEntrySend message carries entries for the multiplex table used by the transmitting terminal. These multiplex table entries are used by the receiving terminal to demultiplex video and audio data sent in the MUX-PDUs.

FIG. 5 shows an exemplary format for the NonStandard request message. In general, the NonStandard request message may have any format and may carry any information for the video call. For example, the NonStandard request message may simply include the first four fields, or the first four fields and the MultiplexEntrySend message, or some other combination of fields. The NonStandard request message format may be customized, for example, for different version numbers, for different proprietary flags, and so on. A terminal may support multiple NonStandard request message formats (e.g., for different version numbers) and may determine the proper message format to use based on the version number and/or the proprietary flag included in the received proprietary sequence. In any case, the use of the NonStandard request message allows both terminals to exchange all pertinent capability information via a single H.245 signaling message instead of many H.245 signaling messages normally needed for the regular call setup specified by H.324. The quick call setup procedure thus greatly speeds up the setup stage for the H.324 video call.

Referring back to FIG. 2, the quick call setup procedure can have several possible outcomes depending on whether terminal A and/or terminal B support the quick call setup procedure. The possible outcomes are described below.

If one terminal supports the quick call setup procedure and the other terminal does not support the quick call setup procedure, then the new terminal would fail to detect the proprietary sequence from the legacy terminal. The legacy terminal would not recognize the proprietary sequence sent by the new terminal, would discard or ignore the proprietary sequence, and would process the regular stuffing sequences sent along with the proprietary sequence. Upon completing the mobile level detect phase, both terminals would perform regular H.245 negotiations.

If both terminals support the quick call setup procedure, then both terminals would send the proprietary sequence along with the regular stuffing sequences. If both terminals receive the proprietary sequence from the other terminal, then both terminals would perform the quick call setup shown in FIG. 2 and exchange the NonStandard request message.

If both terminals support the quick call setup procedure but only one terminal receives the proprietary sequence from the other terminal, then the terminal that receives the proprietary sequence would perform the quick call setup and would send out the NonStandard request message. Since H.245 is a reliable protocol and each H.245 message is guaranteed to deliver correctly, the terminal that failed to receive the proprietary sequence would receive the NonStandard request message and would recognize that the other terminal supports the quick call setup procedure. The terminal that failed to receive the proprietary sequence would then switch from regular call setup to quick call setup.

If both terminals support the quick call setup procedure but none of the terminals receives the proprietary sequence, then both terminals would perform the regular call setup. Both terminals would start regular H.245 negotiations.

Figure 6:
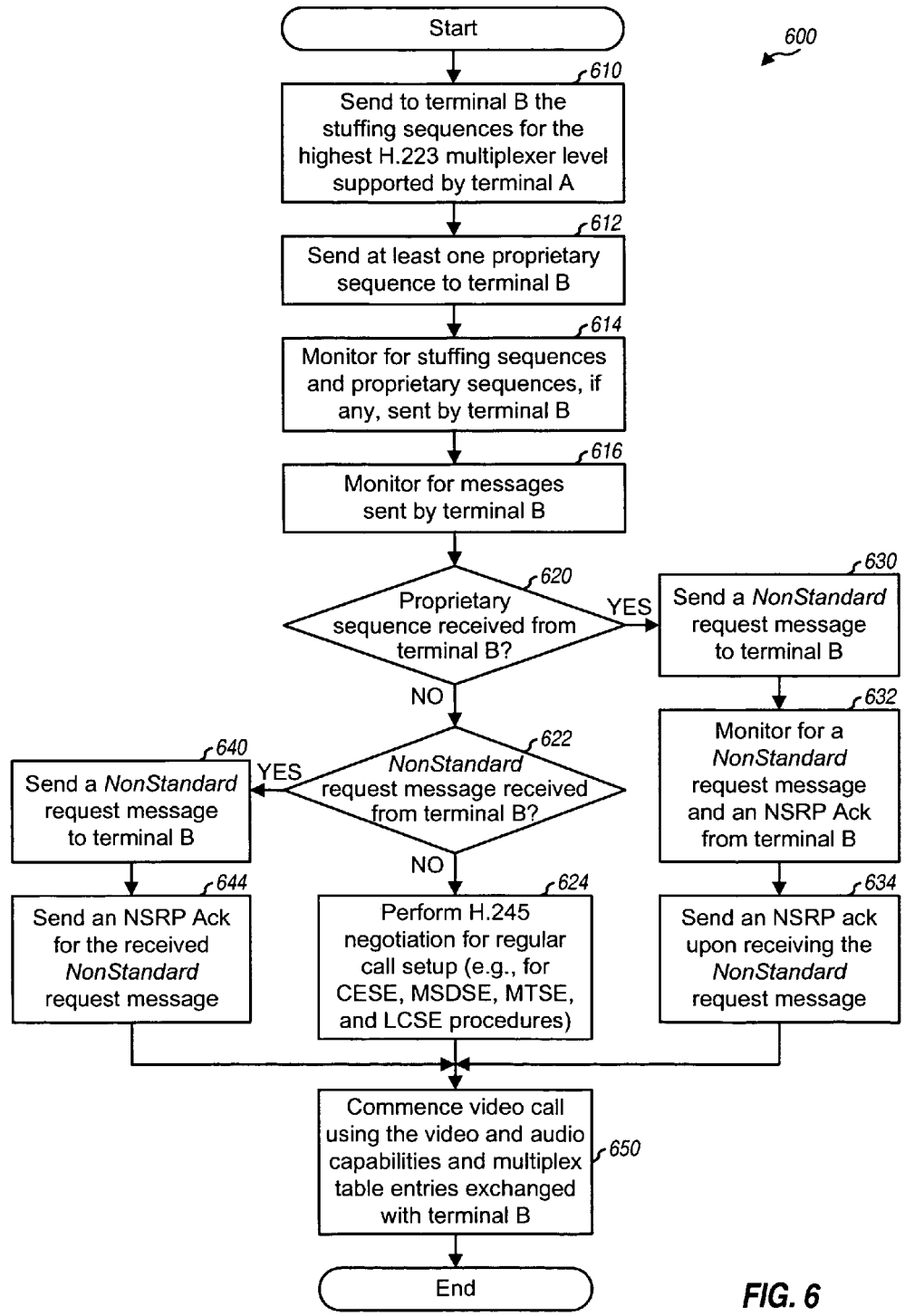
FIG. 6 shows a process for setting up a video call using the quick call setup procedure.

FIG. 6 shows a flow diagram of a process 600 performed by terminal A for setting up a video call using the quick call setup procedure. For the mobile level detect phase, terminal A sends to terminal B the stuffing sequences for the highest H.223 multiplexer level supported by terminal A (block 610). Terminal A also sends at least one proprietary sequence, which may be dispersed among the stuffing sequences sent to terminal B (block 612). While terminal A is sending the stuffing and proprietary sequences to terminal B, terminal A also monitors for stuffing sequences and proprietary sequences, if any, sent by terminal B (block 614). Terminal A typically performs the mobile level detect phase until it receives a recognizable sequence from terminal B or the video call is aborted. Terminal A also monitors for messages sent by terminal B, which may have initiated phase 2 (block 616).

A determination is then made whether a proprietary sequence was received from terminal B (block 620). If the answer is 'Yes', then terminal A proceeds to block 630 and performs phase 2 of the quick call setup procedure. Otherwise, if the answer is 'No' for block 620, then a determination is made whether a NonStandard request message was received from terminal B (block 622). Terminal B may support quick call setup and may have sent the proprietary sequence to terminal A. Terminal A may have simply failed to detect the proprietary sequence sent by terminal B in the mobile level detect phase. Receipt of the NonStandard request message from terminal B would indicate that terminal B supports the quick call setup procedure. Thus, if the answer is 'Yes' for block 622, then terminal A proceeds to block 640 and performs phase 2 of the quick call setup procedure.

If a proprietary sequence or a NonStandard request message was not received from terminal B and the answer is 'No' for both blocks 620 and 622, then terminal A performs H.245 negotiations for the regular call setup (block 624). This may entail performing the procedures for CESE, MSDSE, MTSE, and LCSE in the normal manner as specified by the H.245 standard.

If a proprietary sequence was received from terminal B and the answer is 'Yes' for block 620, then terminal A performs phase 2 of the quick call setup procedure. Terminal A sends a NonStandard request message that may contain the information shown in Table 2 and FIG. 5 (block 630). Terminal A also monitors for a NonStandard request message from terminal B and an NSRP acknowledgment for the NonStandard request message sent by terminal A (block 632). Terminal A sends an NSRP acknowledgment to terminal B upon receiving the NonStandard request message from terminal B (block 634).

If a NonStandard request message was received from terminal B and the answer is 'Yes' for block 622, then terminal A sends a NonStandard request message to terminal B (block 640). Terminal A also sends an NSRP acknowledgment to terminal B for the NonStandard request message received from terminal B (block 644). Blocks 640 and 644 are similar to blocks 630 and 634, respectively.

Upon completing the video call setup in block 624, 634, or 644, terminal A commences the video call using the video and audio capabilities and the multiplex table entries exchanged with terminal B (block 650).

Although not shown in FIG. 6 for simplicity, terminal A may proceed directly from block 620 to block 650 upon receiving a proprietary sequence from terminal B and may communicate with terminal B using the video and audio capabilities conveyed in the proprietary sequence. For this embodiment, default values may be defined for pertinent parameters of the selected video and audio codecs and default entries may be defined for the multiplex table. Terminals A and B may communicate using the default values until these values are updated.

In FIG. 6, terminal A may perform the H.245 negotiations for the regular call setup in block 624 if terminal A does not receive the proprietary sequence but receives the NonStandard request message from terminal B. This may be the case, for example, if terminal A is already performing the regular call setup after the mobile level detect phase, and it is not easy to switch back to the quick call setup. Terminal A may still be allowed to switch from the regular setup to the quick call setup if terminal A has not sent out a CESE message and receives terminal B's NonStandard request message first. Which call setup to perform in block 624 may be dependent on the implementation of the call setup process.

Figure 7:
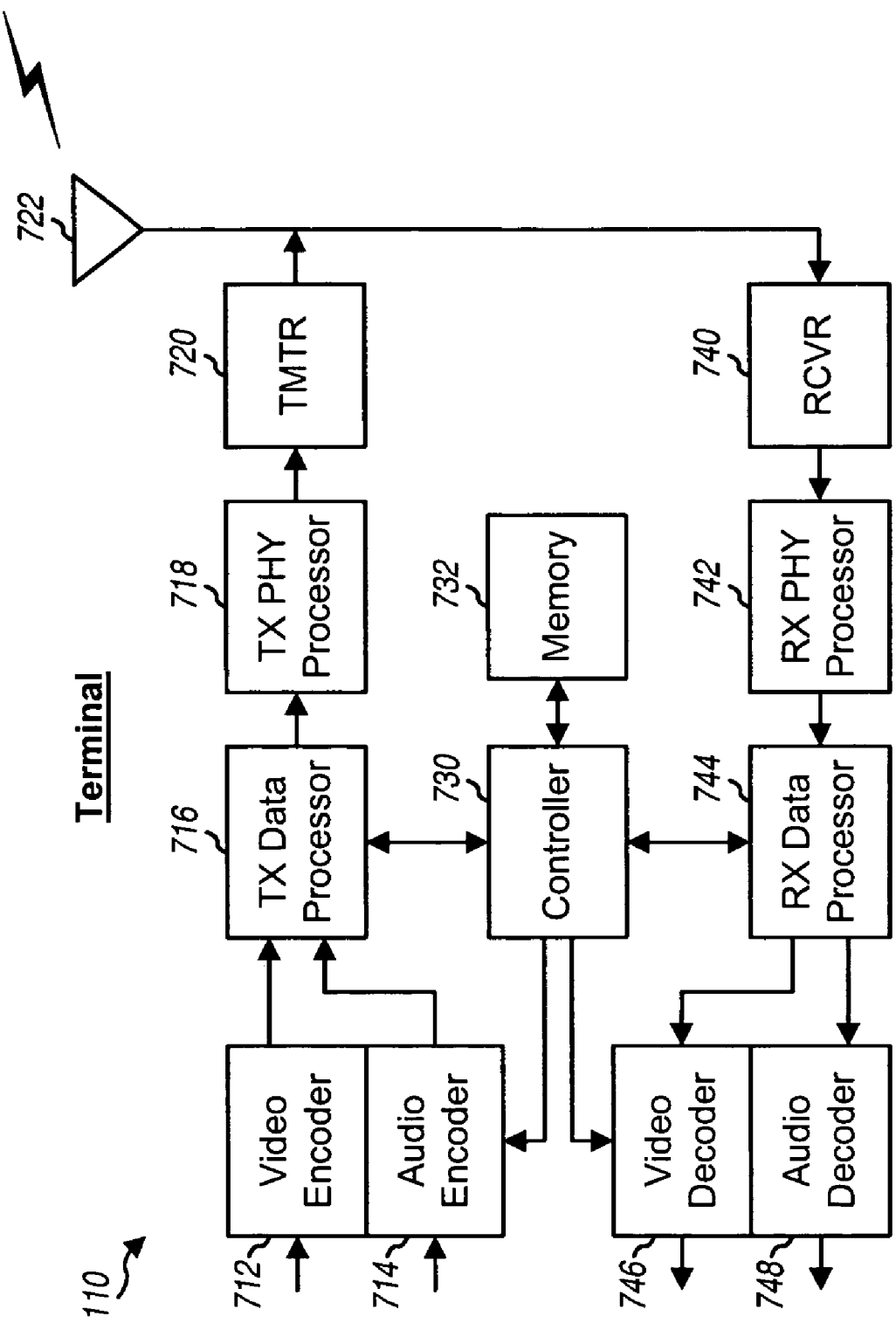
FIG. 7 shows a block diagram of a terminal.

FIG. 7 shows a block diagram of an embodiment of terminal 110, which is capable of implementing the quick call setup procedure described herein. Terminal 110 may be a cellular phone, a handset, a subscriber unit, a mobile station, a user terminal, a wireless device, a modem, or some other apparatus.

On the transmit path, a video encoder 712 receives and encodes a video signal and provides a coded video stream to a transmit (TX) data processor 716. An audio encoder 714 receives and encodes an audio signal and provides a coded audio stream to TX data processor 716. Video encoder 712 and audio encoder 714 perform encoding in accordance with the video and audio capabilities, respectively, exchanged with a remote terminal. TX data processor 716 receives the coded video and audio streams from encoders 712 and 714, respectively, and data and control streams from a controller 730. TX data processor 716 implements the adaptation and multiplex layers for H.223, processes the received media streams, and generates MUX-PDUs. A TX physical layer (PHY) processor 718 performs processing for the physical layer, processes (e.g., encodes, interleaves, and modulates) the MUX-PDUs as specified by the wireless network, and generates PHY packets. A transmitter unit (TMTR) 720 conditions (e.g., converts to analog, filters, amplifies, and frequency upconverts) the PHY packets and generates a modulated signal, which is transmitted via an antenna 722.

On the receive path, antenna 722 receives a modulated signal from a base station and provides a received signal to a receiver unit (RCVR) 740. Receiver unit 740 conditions (e.g., filters, amplifies, and frequency downconverts) the received signal, digitizes the conditioned signal, and provides data samples. A receive (RX) PHY processor 742 processes (e.g., demodulates, deinterleaves, and decodes) the data samples and provides decoded PHY packets to an RX data processor 744. RX data processor 744 implements the adaptation and multiplex layers for H.223 at the receiver and processes the decoded PHY packets. RX data processor 744 extracts the MUX-PDUs in each decoded PHY packet, performs error detection and/or correction if applicable, and demultiplexes the video, audio, data, and control onto separate media streams. RX data processor 744 provides the recovered video stream to a video decoder 746, the recovered audio stream to an audio decoder 748, and recovered data and control streams to controller 730.

Video decoder 746 processes the recovered video stream and provides a decoded video signal. Audio decoder 748 processes the recovered audio stream and provides a decoded audio signal. Controller 730 processes the recovered data and control streams, provides decoded data, and generates controls to properly present the decoded video, audio, and data. Controller 730 also controls the operation of the processing units at terminal 110. A memory unit 732 stores data and program codes used by controller 730.

For call setup, controller 730 may perform the call flow shown in FIG. 2 and/or process 600 shown in FIG. 6. For the mobile level detect phase, controller 730 directs TX data processor 716 to transmit stuffing sequences and proprietary sequences to a remote terminal and directs RX data processor 744 to monitor for stuffing sequences and proprietary sequences sent by the remote terminal. Controller 730 initiates either regular call setup or quick call setup depending on whether a proprietary sequence is received from the remote terminal. Controller 730 also directs transmission of a NonStandard request message to the remote terminal and reception of a NonStandard request message from the remote terminal.

The quick call setup described herein may be implemented by various means. For example, the quick call setup may be implemented in hardware, software, or a combination thereof. For a hardware implementation, the processing units used to perform the quick call setup may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the quick call setup may be implemented with modules (e.g., procedures, functions, and so on) that perform the functions described herein. The software codes may be stored in a memory unit (e.g., memory unit 732 in FIG. 7) and executed by a processor (e.g., controller 730). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of setting up a video call in a wireless communication system, comprising:
    establishing a connection between a first terminal and a second terminal;
    sending from the first terminal to the second terminal a plurality of stuffing sequences for a highest multiplexer level supported by the first terminal;
    sending from the first terminal to the second terminal at least one proprietary sequence indicating support for quick call setup of the video call, wherein the first terminal sends the at least one proprietary sequence along with the plurality of stuffing sequences to the second terminal during a detect phase, and wherein the detect phase occurs after the connection between the first terminal and the second terminal has been established;
    monitoring for stuffing sequences and proprietary sequences, if any, sent by the second terminal; and
    providing a flag value indicating support for the quick call setup in each of the at least one proprietary sequence.

2. The method of claim 1, further comprising:
    providing a version number supported by the first terminal for the quick call setup in each of the at least one proprietary sequence.

3. The method of claim 1, further comprising:
    providing video capability supported by the first terminal in each of the at least one proprietary sequence.

4. The method of claim 1, further comprising:
    providing video coders/decoders (codecs) supported by the first terminal and a preference order in each of the at least one proprietary sequence.

5. The method of claim 1, further comprising:
    providing audio capability supported by the first terminal in each of the at least one proprietary sequence.

6. The method of claim 1, further comprising:
providing audio coders/decoders (codecs) supported by the first terminal and a preference order in each of the at least one proprietary sequence.

7. The method of claim 1, further comprising:
if a proprietary sequence is detected from the second terminal, commencing the video call based on video capability in the detected proprietary sequence.

8. The method of claim 1, further comprising:
sending a message containing video and audio capabilities included in the at least one proprietary sequence sent to the second terminal if a proprietary sequence is detected from the second terminal.

9. The method of claim 1, further comprising:
sending a message containing video capability for the first terminal if a proprietary sequence is detected from the second terminal.

10. The method of claim 1, further comprising:
sending a message containing audio capability for the first terminal if a proprietary sequence is detected from the second terminal.

11. The method of claim 1, further comprising:
sending a message containing entries for a multiplex table used by the first terminal if a proprietary sequence is detected from the second terminal.

12. The method of claim 1, further comprising:
sending a message containing parameters for logical channels used by the first terminal if a proprietary sequence is detected from the second terminal.

13. The method of claim 1, further comprising:
performing call setup in accordance with an H.324 standard if a proprietary sequence is not detected from the second terminal.

14. An apparatus in a wireless communication system, comprising:
a transmit data processor operative to send to a remote terminal a plurality of stuffing sequences for a highest multiplexer level supported and at least one proprietary sequence indicating support for quick call setup of a video call and operative to provide supported video and audio coders/decoders (codecs) in each of the at least one proprietary sequence, wherein the transmit data processor is operative to send the at least one proprietary sequence along with the plurality of stuffing sequences to the remote terminal during a detect phase, and wherein the detect phase occurs after a connection between the apparatus and the remote terminal has been established; and
a receive data processor operative to monitor for stuffing sequences and proprietary sequences, if any, sent by the remote terminal.

15. The apparatus of claim 14, wherein the transmit data processor is operative to send a message containing video and audio capabilities if a proprietary sequence is detected from the remote terminal.

16. The apparatus of claim 14, wherein the transmit data processor is operative to send a message containing entries for a multiplex table if a proprietary sequence is detected from the remote terminal.

17. The apparatus of claim 14, further comprising:
a controller operative to perform call setup in accordance with an H.324 standard if a proprietary sequence is not detected from the remote terminal.

18. An apparatus in a wireless communication system, comprising:
means for establishing a connection between the apparatus and a remote terminal;
means for sending to the remote terminal a plurality of stuffing sequences for a highest multiplexer level supported;
means for sending to the remote terminal at least one proprietary sequence indicating support for quick call setup of a video call, wherein the at least one proprietary sequence is sent along with the plurality of stuffing sequences to the remote terminal during a detect phase, and wherein the detect phase occurs after the connection between the apparatus and the remote terminal has been established;
means for monitoring for stuffing sequences and proprietary sequences, if any, sent by the remote terminal; and
means for providing supported video and audio coders/decoders (codecs) in each of the at least one proprietary sequence.

19. The apparatus of claim 18, further comprising:
means for sending a message containing video and audio capabilities if a proprietary sequence is detected from the remote terminal.

20. The apparatus of claim 18, further comprising:
means for sending a message containing entries for a multiplex table if a proprietary sequence is detected from the remote terminal.

21. The apparatus of claim 18, further comprising:
means for performing call setup in accordance with an H.324 standard if a proprietary sequence is not detected from the remote terminal.

22. A processor readable storage medium encoded with instructions that, when executed by a processor, cause the processor to:
establish a connection between the wireless terminal and a remote terminal;
send from the wireless terminal to the remote terminal a plurality of stuffing sequences for a highest multiplexer level supported by the wireless terminal;
send from the wireless terminal to the remote terminal at least one proprietary sequence indicating support for quick call setup of a video call, wherein the at least one proprietary sequence is sent along with the plurality of stuffing sequences to the remote terminal during a detect phase, and wherein the detect phase occurs after the connection between the wireless terminal and the remote terminal has been established;
monitor for stuffing sequences and proprietary sequences, if any, sent by the remote terminal; and
provide video and audio coders/decoders (codecs) supported by the wireless terminal in each of the at least one proprietary sequence.

23. The processor readable storage medium of claim 22, further encoded with instructions that cause the processor to:
send a message containing video and audio capabilities for the wireless terminal if a proprietary sequence is detected from the remote terminal.

24. The processor readable storage medium of claim 22, further encoded with instructions that cause the processor to:
send a message containing entries for a multiplex table used by the wireless terminal if a proprietary sequence is detected from the remote terminal.

25. The processor readable storage medium of claim 22, further encoded with instructions that cause the processor to:
perform call setup in accordance with an H.324 standard if a proprietary sequence is not detected from the remote terminal.

26. A method of setting up a video call in a wireless communication system, comprising:

establishing a connection between a first terminal and a second terminal;

sending from the first terminal to the second terminal a plurality of stuffing sequences for a highest multiplexer level supported by the first terminal;

sending from the first terminal to the second terminal at least one proprietary sequence indicating support for quick call setup of the video call, wherein the first terminal sends the at least one proprietary sequence along with the plurality of stuffing sequences to the second terminal during a detect phase, and wherein the detect phase occurs after the connection between the first terminal and the second terminal has been established;

monitoring for stuffing sequences and proprietary sequences, if any, sent by the second terminal; and providing a version number supported by the first terminal for the quick call setup in each of the at least one proprietary sequence.

27. The method of claim 26, further comprising:
providing a flag value indicating support for the quick call setup in each of the at least one proprietary sequence.

28. The method of claim 26, further comprising:
providing video capability supported by the first terminal in each of the at least one proprietary sequence.

29. The method of claim 26, further comprising:
providing video coders/decoders (codecs) supported by the first terminal and a preference order in each of the at least one proprietary sequence.

30. The method of claim 26, further comprising:
providing audio capability supported by the first terminal in each of the at least one proprietary sequence.

31. The method of claim 26, further comprising:
providing audio coders/decoders (codecs) supported by the first terminal and a preference order in each of the at least one proprietary sequence.

32. The method of claim 26, further comprising:
if a proprietary sequence is detected from the second terminal, commencing the video call based on video capability in the detected proprietary sequence.

33. The method of claim 26, further comprising:
sending a message containing video and audio capabilities included in the at least one proprietary sequence sent to the second terminal if a proprietary sequence is detected from the second terminal.

34. The method of claim 26, further comprising:
sending a message containing video capability for the first terminal if a proprietary sequence is detected from the second terminal.

35. The method of claim 26, further comprising:
sending a message containing audio capability for the first terminal if a proprietary sequence is detected from the second terminal.

36. The method of claim 26, further comprising:
sending a message containing entries for a multiplex table used by the first terminal if a proprietary sequence is detected from the second terminal.

37. The method of claim 26, further comprising:
sending a message containing parameters for logical channels used by the first terminal if a proprietary sequence is detected from the second terminal.

38. The method of claim 26, further comprising:
performing call setup in accordance with an H.324 standard if a proprietary sequence is not detected from the second terminal.

39. A method of setting up a video call in a wireless communication system, comprising:

establishing a connection between a first terminal and a second terminal;

sending from the first terminal to the second terminal a plurality of stuffing sequences for a highest multiplexer level supported by the first terminal;

sending from the first terminal to the second terminal at least one proprietary sequence indicating support for quick call setup of the video call, wherein the first terminal sends the at least one proprietary sequence along with the plurality of stuffing sequences to the second terminal during a detect phase, and wherein the detect phase occurs after the connection between the first terminal and the second terminal has been established;

monitoring for stuffing sequences and proprietary sequences, if any, sent by the second terminal; and providing video coders/decoders (codecs) supported by the first terminal and a preference order in each of the at least one proprietary sequence.

40. The method of claim 39, further comprising:
providing a flag value indicating support for the quick call setup in each of the at least one proprietary sequence.

41. The method of claim 39, further comprising:
providing a version number supported by the first terminal for the quick call setup in each of the at least one proprietary sequence.

42. The method of claim 39, further comprising:
providing video capability supported by the first terminal in each of the at least one proprietary sequence.

43. The method of claim 39, further comprising:
providing audio capability supported by the first terminal in each of the at least one proprietary sequence.

44. The method of claim 39, further comprising:
providing audio coders/decoders (codecs) supported by the first terminal and a preference order in each of the at least one proprietary sequence.

45. The method of claim 39, further comprising:
if a proprietary sequence is detected from the second terminal, commencing the video call based on video capability in the detected proprietary sequence.

46. The method of claim 39, further comprising:
sending a message containing video and audio capabilities included in the at least one proprietary sequence sent to the second terminal if a proprietary sequence is detected from the second terminal.

47. The method of claim 39, further comprising:
sending a message containing video capability for the first terminal if a proprietary sequence is detected from the second terminal.

48. The method of claim 39, further comprising:
sending a message containing audio capability for the first terminal if a proprietary sequence is detected from the second terminal.

49. The method of claim 39, further comprising:
sending a message containing entries for a multiplex table used by the first terminal if a proprietary sequence is detected from the second terminal.

50. The method of claim 39, further comprising:
sending a message containing parameters for logical channels used by the first terminal if a proprietary sequence is detected from the second terminal.

51. The method of claim 39, further comprising:
performing call setup in accordance with an H.324 standard if a proprietary sequence is not detected from the second terminal.

52. A method of setting up a video call in a wireless communication system, comprising:

establishing a connection between a first terminal and a second terminal;

sending from the first terminal to the second terminal a plurality of stuffing sequences for a highest multiplexer level supported by the first terminal;

sending from the first terminal to the second terminal at least one proprietary sequence indicating support for quick call setup of the video call, wherein the first terminal sends the at least one proprietary sequence along with the plurality of stuffing sequences to the second terminal during a detect phase, and wherein the detect phase occurs after the connection between the first terminal and the second terminal has been established;

monitoring for stuffing sequences and proprietary sequences, if any, sent by the second terminal; and providing audio coders/decoders (codecs) supported by the first terminal and a preference order in each of the at least one proprietary sequence.

53. The method of claim 52, further comprising:
providing a flag value indicating support for the quick call setup in each of the at least one proprietary sequence.

54. The method of claim 52, further comprising:
providing a version number supported by the first terminal for the quick call setup in each of the at least one proprietary sequence.

55. The method of claim 52, further comprising:
providing video capability supported by the first terminal in each of the at least one proprietary sequence.

56. The method of claim 52, further comprising:
providing video coders/decoders (codecs) supported by the first terminal and a preference order in each of the at least one proprietary sequence.

57. The method of claim 52, further comprising:
providing audio capability supported by the first terminal in each of the at least one proprietary sequence.

58. The method of claim 52, further comprising:
if a proprietary sequence is detected from the second terminal, commencing the video call based on video capability in the detected proprietary sequence.

59. The method of claim 52, further comprising:
sending a message containing video and audio capabilities included in the at least one proprietary sequence sent to the second terminal if a proprietary sequence is detected from the second terminal.

60. The method of claim 52, further comprising:
sending a message containing video capability for the first terminal if a proprietary sequence is detected from the second terminal.

61. The method of claim 52, further comprising:
sending a message containing audio capability for the first terminal if a proprietary sequence is detected from the second terminal.

62. The method of claim 52, further comprising:
sending a message containing entries for a multiplex table used by the first terminal if a proprietary sequence is detected from the second terminal.

63. The method of claim 52, further comprising:
sending a message containing parameters for logical channels used by the first terminal if a proprietary sequence is detected from the second terminal.

64. The method of claim 52, further comprising:
performing call setup in accordance with an H.324 standard if a proprietary sequence is not detected from the second terminal.

65. A method of setting up a video call in a wireless communication system, comprising:

establishing a connection between a first terminal and a second terminal;

sending from the first terminal to the second terminal a plurality of stuffing sequences for a highest multiplexer level supported by the first terminal;

sending from the first terminal to the second terminal at least one proprietary sequence indicating support for quick call setup of the video call, wherein the first terminal sends the at least one proprietary sequence along with the plurality of stuffing sequences to the second terminal during a detect phase, and wherein the detect phase occurs after the connection between the first terminal and the second terminal has been established;

monitoring for stuffing sequences and proprietary sequences, if any, sent by the second terminal; and if a proprietary sequence is detected from the second terminal, commencing the video call based on video capability in the detected proprietary sequence.

66. The method of claim 65, further comprising:
providing a flag value indicating support for the quick call setup in each of the at least one proprietary sequence.

67. The method of claim 65, further comprising:
providing a version number supported by the first terminal for the quick call setup in each of the at least one proprietary sequence.

68. The method of claim 65, further comprising:
providing video capability supported by the first terminal in each of the at least one proprietary sequence.

69. The method of claim 65, further comprising:
providing video coders/decoders (codecs) supported by the first terminal and a preference order in each of the at least one proprietary sequence.

70. The method of claim 65, further comprising:
providing audio capability supported by the first terminal in each of the at least one proprietary sequence.

71. The method of claim 65, further comprising:
providing audio coders/decoders (codecs) supported by the first terminal and a preference order in each of the at least one proprietary sequence.

72. The method of claim 65, further comprising:
sending a message containing video and audio capabilities included in the at least one proprietary sequence sent to the second terminal if a proprietary sequence is detected from the second terminal.

73. The method of claim 65, further comprising:
sending a message containing video capability for the first terminal if a proprietary sequence is detected from the second terminal.

74. The method of claim 65, further comprising:
sending a message containing audio capability for the first terminal if a proprietary sequence is detected from the second terminal.

75. The method of claim 65, further comprising:
sending a message containing entries for a multiplex table used by the first terminal if a proprietary sequence is detected from the second terminal.

76. The method of claim 65, further comprising:
sending a message containing parameters for logical channels used by the first terminal if a proprietary sequence is detected from the second terminal.

77. The method of claim 65, further comprising:
performing call setup in accordance with an H.324 standard if a proprietary sequence is not detected from the second terminal.

* * * * *